UNITED STATES PATENT OFFICE.

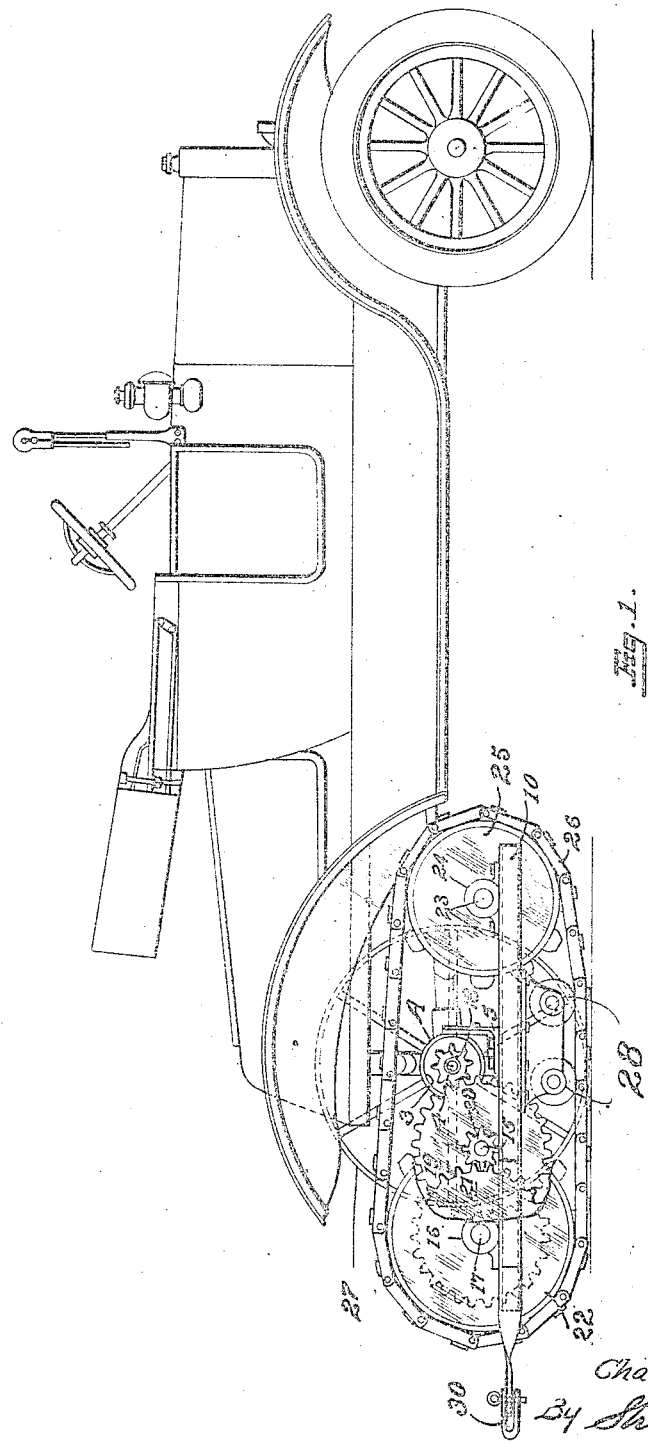

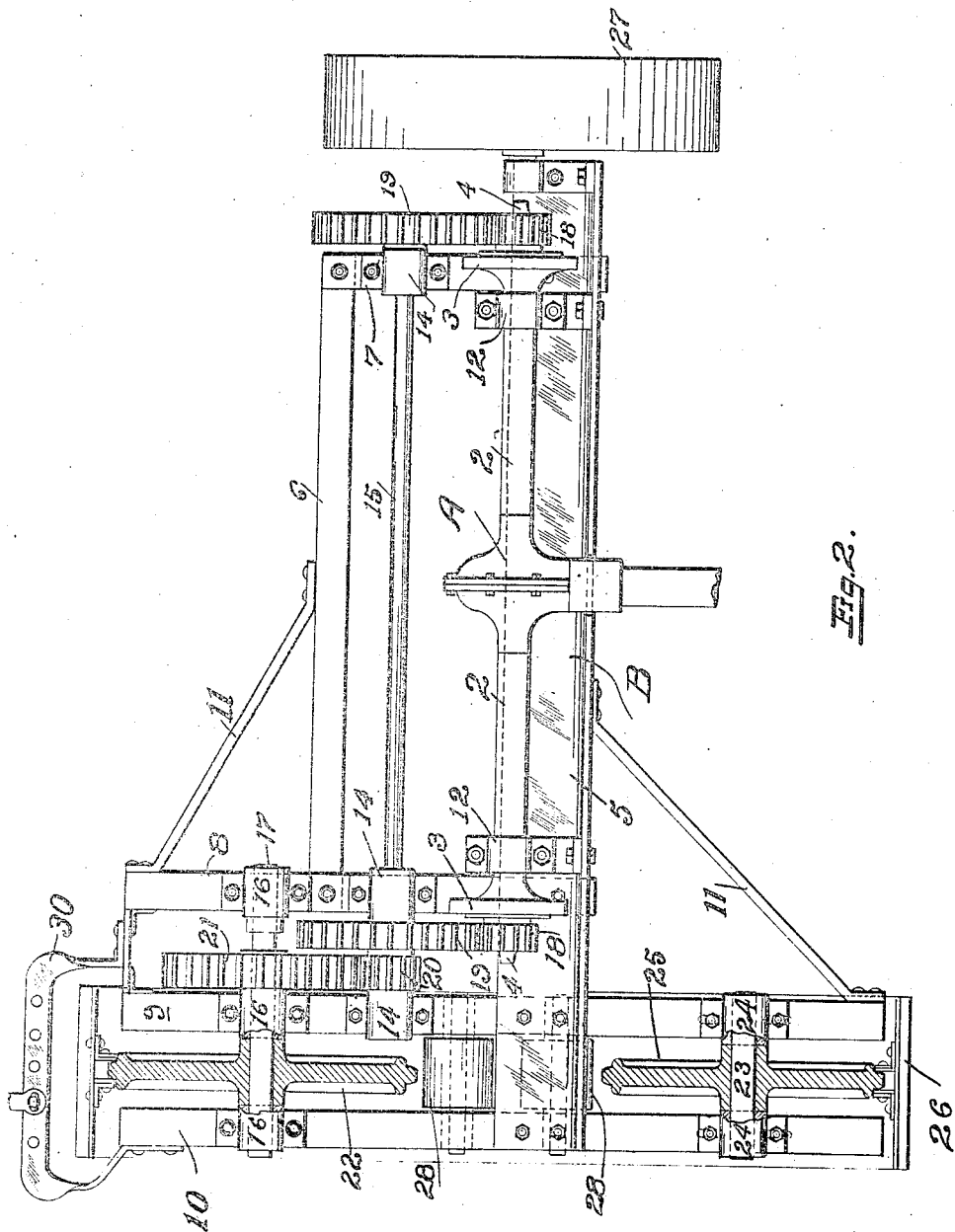

CHARLES F. RODIN, OF SAN FRANCISCO, CALIFORNIA.

AUTO-TRACTOR.

1,288,203. Specification of Letters Patent. Patented Dec. 17, 1918.

Application filed July 31, 1918. Serial No. 247,647.

*To all whom it may concern:*

Be it known that I, CHARLES F. RODIN, a citizen of the United States, residing at the city and county of San Francisco, and State of California, have invented new and useful Improvements in Auto-Tractors, of which the following is a specification.

This invention relates to traction devices, and pertains especially to a tractor attachment for an ordinary automobile or motor vehicle, and one of the objects is to provide an attachment whereby the vehicle may be quickly and easily converted into a tractor of the self-laying track or link belt type, and adapted to agricultural or other uses, and still enable the vehicle to be readily and quickly reconverted into a pleasure car.

Another object of the invention is to provide a tractor in which only one driving track is employed, and in which means are provided for transmitting power to the driving track from both sides of the differential or the rear driving shaft of the vehicle.

Another object of the invention is to provide a track supporting frame or mounting, which is adapted to swing freely about the axle housing so that the track may be operated at a maximum efficiency when passing over hummocks or uneven ground formations.

Further objects will hereinafter appear.

The invention consists of the parts and the construction and combination of parts as hereinafter more fully described and claimed, having reference to the accompanying drawings in which—

Figure 1 is a view in side elevation of a motor vehicle showing the application of the invention.

Fig. 2 is a plan view of the tractor attachment partly in section.

Referring to the drawings in detail. A indicates the differential housing of a standard form of motor vehicle, 2 the axle housing, 3 the brake drums, and 4 the spindles of the divided driving shaft. Adapted to be positioned below the axle housing is a frame generally indicated at B. This frame may be constructed of angle, channel iron or like material, and, in this instance, consists of the bars 5, 6, 7, 8, 9 and 10, which are suitably secured together by rivets or any other means and braced to form a substantial structure as shown at 11. This frame is secured to the axle housing by means of a pair of bearing members 12. These bearing members engage inner collars of the brake drums, and to this extent secure the frame against altered movement on the axle housing. The frame is, however, permitted to turn or swing freely about the axle housing for purposes hereinafter to be described.

Journaled in the bearing members 14 secured on the frame bars 7, 8 and 9 is an intermediate shaft 15, and journaled in the bearing members 16, secured to the frame bars 8, 9 and 10, is a sprocket shaft 17. Adapted to be suitably secured on the axle spindles 4, one on each end, is a pair of driving pinions 18. Secured on the intermediate shaft 15 is a pair of gears 19, which intermesh with the pinions 18, and also secured on the intermediate shaft is a pinion 20, which intermeshes with a gear 21 secured on the sprocket shaft 17. Secured on the sprocket shaft is a driving sprocket 22, and secured on a shaft 23 carried by bearing members 24 is an idler wheel or sprocket 25, which is positioned in direct alinement with the driving sprocket 22. Carried and driven by the sprockets 22 and 25 is an endless flexible link track 26 of suitable construction, and journaled at the opposite end of the frame is an idler wheel 27; the chain track 26 and the wheel 27 forming a support for the frame B and the rear end of the vehicle. The link track is, in this instance, not only supported by the sprockets 22 and 25, but also by intermediate platform rollers as shown at 28. The construction of the link track and the specific mounting of the same forms no particular part in the present invention, as any suitable track and support therefor may be provided.

In operation with power transmitted to the rear divided driving shaft, it can readily be seen that this power is transmitted through the gears 18, 19, 20 and 21 to the driving sprocket 22. This, in turn, propels or drives the endless link track, and, thereby serves as a driving member for the same. Any speed desired may be transmitted to the sprocket through the driving shaft and the gears described by the usual transmission with which vehicles of this character are provided.

A tractor attachment constructed and attached in the manner described may be caused to easily follow sharp bends or turns in the direction of travel, this being due to the single track employed. This feature gives the tractor a facility and ease of operation, rendering it useful in many places of service from which other tractors are excluded. In order to permit of obtaining this result, it is desirable that the traction force developed by the tractor should be applied to the ground as close as possible to the turning point of the draw bar. The draw bar as shown at 30 is therefore attached to the frame bars 9 and 10 as shown, so that the traction force developed will be exerted at the turning point of the draw bar.

Another advantage of the present construction is the provision of a tractor which is particularly adapted for use in connection with cultivators and the like. For this purpose the tractor is so constructed that it can travel along the cultivated rows without injury to growing plants and vegetation, this being due to the single track employed; for example, it can readily be seen that the propelling track can travel along corn rows without injury to the standing corn.

Another feature of the invention is the provision of means for exerting all the power transmitted to the rear driving shaft to the driving member or the endless track shown, this being possible in the present instance, as the track is positively driven from both ends of the rear shaft. This feature, together with the pivotal mounting of the frame about the axle housing permits a maximum tractive force to be exerted at all times whether the tractor is turning or traveling in a straight line.

Another feature or advantage are the facilities provided for converting the motor vehicle from a pleasure car to a tractor or vice versa. This is due to the fact that it is only necessary to remove the bearings 12 and the pinions 18 when changing the vehicle, and it is therefore entirely unnecessary to make any changes when applying the present attachment, nor should much time be consumed, nor skilled labor required, as the securing of the bearings 12 and the gears in their proper place completes the attachment.

The construction and the specific arrangement of the several parts forming the attachment, together with the materials and finish employed, may be such as the judgment and experience of the manufacturer may dictate.

I also wish it understood that various changes in form, proportion and minor details of construction may be resorted to within the scope of the appended claims, and that I do not wish to limit myself to the specific design and construction here shown.

Having thus described my invention, what I claim and desire to secure by Letters Patent is:

1. A tractor attachment for motor vehicles comprising a frame adapted to be pivotally attached to the rear axle housing of the vehicle, a single endless flexible link track supporting the frame, and means for transmitting power from both ends of the rear axle of the vehicle to drive the link track.

2. A tractor attachment for motor vehicles comprising a frame adapted to be pivotally attached to the rear axle housing of the vehicle, a single endless flexible link track supporting one end of the frame, an idler wheel supporting the opposite end of the frame, and means for transmitting power from both ends of the rear axle of the vehicle to drive the link track.

3. In a tractor attachment for motor vehicles, a frame, a pair of bearing members on the frame adapted to receive the rear axle housing of the motor vehicle, said bearings permitting an oscillating movement of the frame on the axle housing, an endless flexible track member supporting one end of the frame, an idler wheel supporting the opposite end of the frame, and means for transmitting power from both ends of the rear drive shaft of the vehicle to drive the track member.

4. The combination with the rear driving shaft of a motor vehicle, the differential and the housing surrounding the shaft and the differential of a frame pivotally mounted on the shaft, an endless self-laying track member supporting the frame, and means for transmitting power from both sides of the differential to drive the track member.

5. The combination with the rear divided driving shaft on a motor vehicle of a self-laying endless track member positioned at one end of a divided shaft, and means for transmitting power from both ends of the shaft to drive the track.

6. The combination with the rear divided driving shaft on a motor vehicle and the axle housing surrounding the same, of a frame pivotally mounted on the axle housing, an endless flexible self-laying track member supporting one end of the frame, an idler wheel supporting the opposite end of the frame, and means for transmitting power from both ends of the shaft to drive the track.

7. The combination with a rear divided driving shaft in a motor vehicle, and the axle housing surrounding the same, of a frame pivotally mounted on the axle housing, a driving sprocket and an idler journaled in one end of the frame, an endless link driving track carried by the driving sprocket and the idler, means for transmitting power from both ends of the divided driving shaft to drive the driving sprocket, and an idler wheel carried by the opposite end of the frame.

8. The combination with the rear divided driving shaft in a motor vehicle and the axle housing surrounding the same, of a frame pivotally mounted on the axle housing, a pair of gear pinions adapted to be secured, one on each end of the driving shaft, an intermediate shaft journaled in the frame, a pair of gears secured on said shaft and intermeshing with the driving pinions a pinion secured on the intermediate shaft, a sprocket driving shaft journaled in the frame, a gear secured on said shaft intermeshing with the pinion on the intermediate shaft, a sprocket wheel secured on the sprocket shaft, an idler wheel journaled in the frame in alinement with the sprocket wheel, an endless flexible track member carried by the sprocket and the idler wheel, and supporting one end of the frame, and an idler wheel supporting the opposite end of the frame.

In testimony whereof I have hereunto set my hand in the presence of two subscribing witnesses.

CHARLES F. RODIN.

Witnesses:
JOHN H. HERRING,
THOS. CASTBERG.